United States Patent [19]

Akesaka et al.

[11] Patent Number: 5,054,976

[45] Date of Patent: Oct. 8, 1991

[54] INSIDE PROCESSING APPARATUS

[75] Inventors: Toshio Akesaka, Yokohama; Takashi Ogawara, Funabashi, both of Japan

[73] Assignee: Kabushiki Kaisha Isekikaihatsu Koki, Japan

[21] Appl. No.: 521,344

[22] Filed: May 9, 1990

[30] Foreign Application Priority Data

May 9, 1989 [JP] Japan ............................ 1-114282
Jul. 10, 1989 [JP] Japan ............................ 1-175507

[51] Int. Cl.⁵ .......................... B23C 3/16; B24B 5/40
[52] U.S. Cl. .................................. 409/143; 51/245
[58] Field of Search ............... 409/143, 140, 180, 179, 409/74; 51/245

[56] References Cited

U.S. PATENT DOCUMENTS

| 1,365,149 | 1/1921 | Breed | 51/245 |
| 4,129,062 | 12/1978 | Bergmann et al. | 409/143 |
| 4,383,395 | 5/1983 | Wilger et al. | 51/245 |

FOREIGN PATENT DOCUMENTS

| 596022 | 10/1925 | France | 51/245 |
| 62404 | 4/1985 | Japan | 409/143 |
| 854610 | 8/1981 | U.S.S.R. | 409/143 |

Primary Examiner—William Briggs
Attorney, Agent, or Firm—Eckert Seamans Cherin & Mellott

[57] ABSTRACT

The present invention relates to an inside processing apparatus for performing operations of cleaning, grinding, cutting and the like toward an inside of piping of a water pipe, a gas pipe, a wire pipe and the like. The said inside processing apparatus is constituted by possessing a working head having the working member (tool) for performing a fixed work on the cylindrical wall surface, a driving mechanism for moving the said working member in the circumferential direction of the cylindrical wall surface and a cutting controlling mechanism for controlling a quantity of the movement in company with a fact that the said working head is moved in the radial direction of cylindrical wall surface by the said driving mechanism.

10 Claims, 6 Drawing Sheets

INSIDE PROCESSING APPARATUS

FIELD OF THE INVENTION

The present invention relates to an inside processing apparatus for performing operations of cleaning, grinding, cutting and the like toward an inside of piping of an up-and-down water pipe laid under the ground, a gas pipe, a wire pipe and the like or an inside of tunnel and the like, further an inside of steel pipe, a cylindrical face formed in steel ingot and the like.

DESCRIPTION OF THE PRIOR ART

At the present time, a concrete pipe, a steel pipe, an earthen pipe and the like having various diameter are laid under ground as up-and-down water pipe, a gas pipe, a wire pipe in the ground. Also, a steel pipe pile, a steel pipe-sheet pile and the like are used in the job site of civil engineering works.

The construction works including maintenance, repair, improvement or withdrawal and the like are performed in regard to the above-mentioned various pipes. At this time, it becomes necessary that the processing in response to the purpose of respective construction works in the inside of pipe is given, therefore various pipe interior working machine in response to the purpose of construction works are offered.

Considering the works in regard to a sewerage pipe and the like for example, there are removing works of root of tree and the like which are penetrated into an inside from a joint of pipeline and are removing works and the like of earth and sand attached to an inner wall of pipeline and rust and the like. Also, considering the works in regard to a steel pipe pile, a steel pipe-sheet pile and the like, there is a cutting work on the occasion which these steel pipes are withdrawn.

Recently, a method of construction for repairing a portion of the sewerage pipe toward the said sewerage pipe and the like which are corroded or destroyed partially has been developed. In this method of construction, grooves having a fixed depth are formed at both sides in the axial direction of the repairing portion, and a plastic lining is performed by regarding the said groove as a cardinal point.

It is plentiful that the working machine which is offered in order to perform the works an mentioned above is the so-called single capacity machine which the respective functions are fixed, and the tools including wire brush, milling cutter, end mill and the like are moved in the radial direction of pipeline by an oil pressure cylinder and the like in response to the purposive workings as well as it is plentiful that the said machine in constituted so as to rotate in the circumferential direction by regarding an axial center of the working machine as a center.

For example, in the case which the processings of groove and the like are performed in the inner wall of pipe by using the end mill on the occasion of a partial repair of pipeline, it becomes necessary that the end mill is moved in the radial direction in response to the inside diameter of pipe and the depth of groove to be processed. But, it belongs to a difficult technique that a rod of the oil pressure cylinder is stopped in the middle of the stroke by controlling accurately a quantity of the pressure oil which is supplied in the said cylinder. Consequently, it is difficult that a depth of the said groove is administered accurately, and an apprehension which an obstacle is generated in the execution of the plastic lining in regard to the pipeline is in existence.

In the machine for working the interior of pipe as mentioned above, the development of the processing apparatus which has the compound functions and can establish accurately a quantity of the movement of the tool toward a radial direction of the pipeline has been desired.

SUMMARY OF THE INVENTION

A principal purpose of the present invention is to provide an inside processing apparatus which can perform plural works in regard to an inside of pipe.

Further, an other purpose is to provide an inside processing apparatus which a quantity of movement of the tool in regard to a radial direction of pipeline can be established accurately.

Therefore, in order to accomplish these purposes, the inside processing apparatus in accordance with the present invention is constituted by processing a working head having the working member (tool) for performing a fixed work on the cylindrical wall surface, a driving mechanism for moving the said working member in the circumferential direction of cylindrical wall surface and a cutting controlling mechanism for controlling a quantity of the movement in company with a fact that the said working head is moved in the radial direction of cylindrical wall surface by the said driving mechanism.

In the above-mentioned inside processing apparatus, the working head is constituted by a circular cam which has a center in the position separated at a fixed distance from an axial center of the inside processing apparatus and rotates and moves by regarding an axial center of the inside processing apparatus as a rotating center, and a head cover which has a link mechanism and engages with a cam surface of the said circular cam, rotates and moves by regarding a center of the said circular cam as a rotating center and supports rotatably an axis for the purpose of attaching the working member, and the driving mechanism is constituted by a sun gear, a first planet gear which engages with the said sun gear and is connected with the circular cam forming the working head, a second planet gear which engages with the said sun gear and is connected to the head cover forming the working head through a link mechanism, and the cutting controlling mechanism is constituted by an inner teeth gear which engages with the second planet gear and is constituted rotatably and a driving means for driving the said inner teeth gear, and further the driving means is constituted by disposing a piston performing a straight reciprocation in the casing, a shaft which engages with the said piston and converts a straight motion of the said piston into the rotating motion, a rotating and moving member for rotating and driving the said piston by engaging with the said piston, a regulating member for regulating the stroke limit of the said piston by coming into contact with the said piston in company with a fact that the said rotating and moving member is formed so as to be able to rotate, move and fix in regard to the casing.

According to the above-mentioned present invention, while the working member including most suitable wire brush, grinder, milling cutter and the like in response to the works of the purpose is rotating by regarding the axial line of the said working member as a center, the said working member is moved along the inside of pipe, and it is possible that a fixed working is performed toward the inner wall by this movement. Therefore, it is possible that the different works including cleaning work, grinding work, cutting work, severance work and the like are performed by one processing apparatus, the said cleaning work includes a removal of adhesive matter toward the inner wall of pipe or an exclusion of rust and the like.

That is to say, when the first planet gear and the second planet gear are driven by driving the sun gear constituting the driving mechanism, a circular cam connected with the first planet gear rotates with a fixed velocity in the fixed direction by regarding an axial center of the inside processing apparatus as a rotating center, simultaneously a link mechanism is constituted in the head cover, and the rotating velocity which is identical with the rotating velocity of the circular cam is transmitted through an arm connected with the second planet gear and a link plate. Consequently, without a generation of sliding between the circular cam and the head cover, the rotation of the head cover is performed with the same velocity in the same direction by regarding the axial center of the inside processing apparatus as a rotating center. Therefore, it is possible that the shaft which is supported by the head cover and installs the working member is rotated in the circumferential direction by regarding an axial center of the inside processing apparatus as a center.

By means of the driving means constituting the cutting controlling mechanism in the driving of the sun gear, when the inner teeth gear which is constituted rotatably and engages with the second planet gear is driven, a revolution velocity of the second planet gear changes in keeping with a rotation of the inner teeth gear, a relative velocity difference is generated between the second planet gear and the first planet gear.

Namely, the circular cam connected with the first planet gear rotates with a fixed velocity in a fixed direction by regarding an axial center of the inside processing apparatus as a rotating center and simultaneously a revolution velocity of the second planet gear is transmitted in the head cover through an arm and a link plate. At this time, a crossing angle between an arm and a link plate changes in response to the revolving velocity difference between the first plant gear and the second planet gear as well as the head cover rotates and moves by regarding the center of circular cam as a rotating center. Therefore, a center of the circular cam is displaced on the circumference of a circle which an axial center of the inside processing apparatus is regarded as the rotating center, and simultaneously a posture of the head cover changes as regulated by a crossing angle between a central position of the circular cam and an arm and a link plate. At this time, in order that the moving direction of the head cover may be restricted by the link mechanism, it is possible that the working member is moved in the radial direction by regarding an axial center of the inside processing apparatus as a center.

Also, when the inner teeth gear is driven by the driving means within a state which the sun gear is not driven, the first planet gear maintains a state which the revolution is stopped and the second planet gear only revolves with regard to the circumference of the sun gear. Namely, the head cover rotates and moves in a state which the circular cam is stopped. Therefore, the rotation is transmitted in the head cover through an arm and a link plate. At this time, since a position of the rotating center (a center of the circular cam) of the head cover is fixed, a crossing angle between an arm and a link plate changes by the rotating force transmitted through an arm, and simultaneously the head cover rotates and moves by regarding the center of the circular cam as the rotating center. At this time, the working member moves in the radial direction of the inside processing apparatus.

As mentioned above, a movement to the radial direction of the working member is not a straight movement, and becomes a movement having spiral shape which is formed by compounding a rotation and a movement which are regarded an axial center of the inside processing apparatus as a center and a straight movement which is regulated by a link mechanism.

In this way, in the case which the inner teeth gear is driven at a time which the sun gear is not driven, it is possible that a distance between an axial center of the inside processing apparatus and a working member attached to the processing head is instituted. Namely, it is possible that an initial radius of the working member in response to a diameter of pipe is instituted. Also, in the case which the inner teeth gear is driven at the driving time of the sun gear, it is possible that a depth of disfunction or cutting toward the inner wall of pipe in accordance with the said working member is instituted while the working member is moved in the direction of the circumference of a circle.

By establishing a quantity of revolution and a rotating velocity (rotating angle, rotating velocity) of the said inner teeth gear previously by means of the driving means, it is possible that an approaching distance or a cutting depth and an approaching velocity or a cutting velocity toward the inner wall of pipe in accordance with the working member are instituted with a desirable value.

DETAILED DESCRIPTION OF THE PREFERRED EMBODIMENTS

Figure 1:
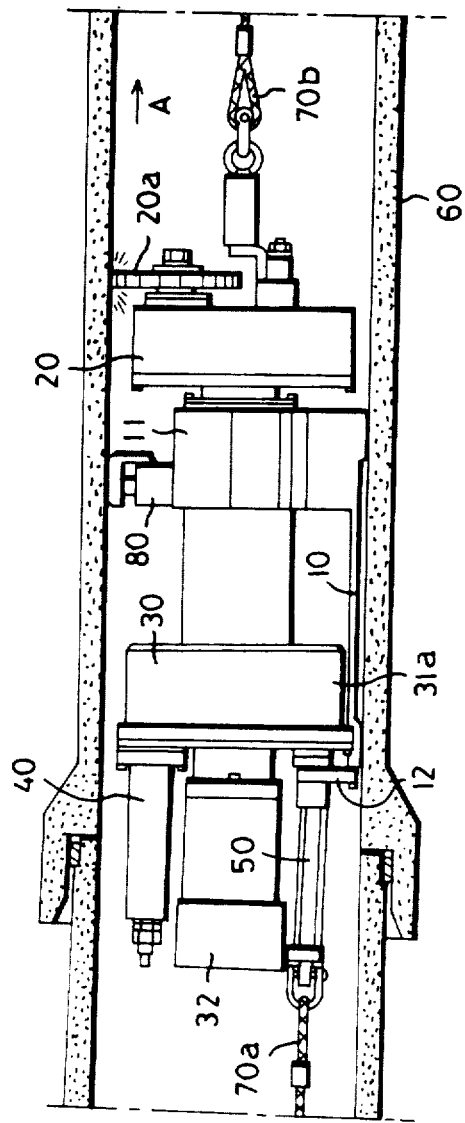
FIG. 1 is a side explanatory view of the inside processing apparatus in the present invention.
Figure 2:
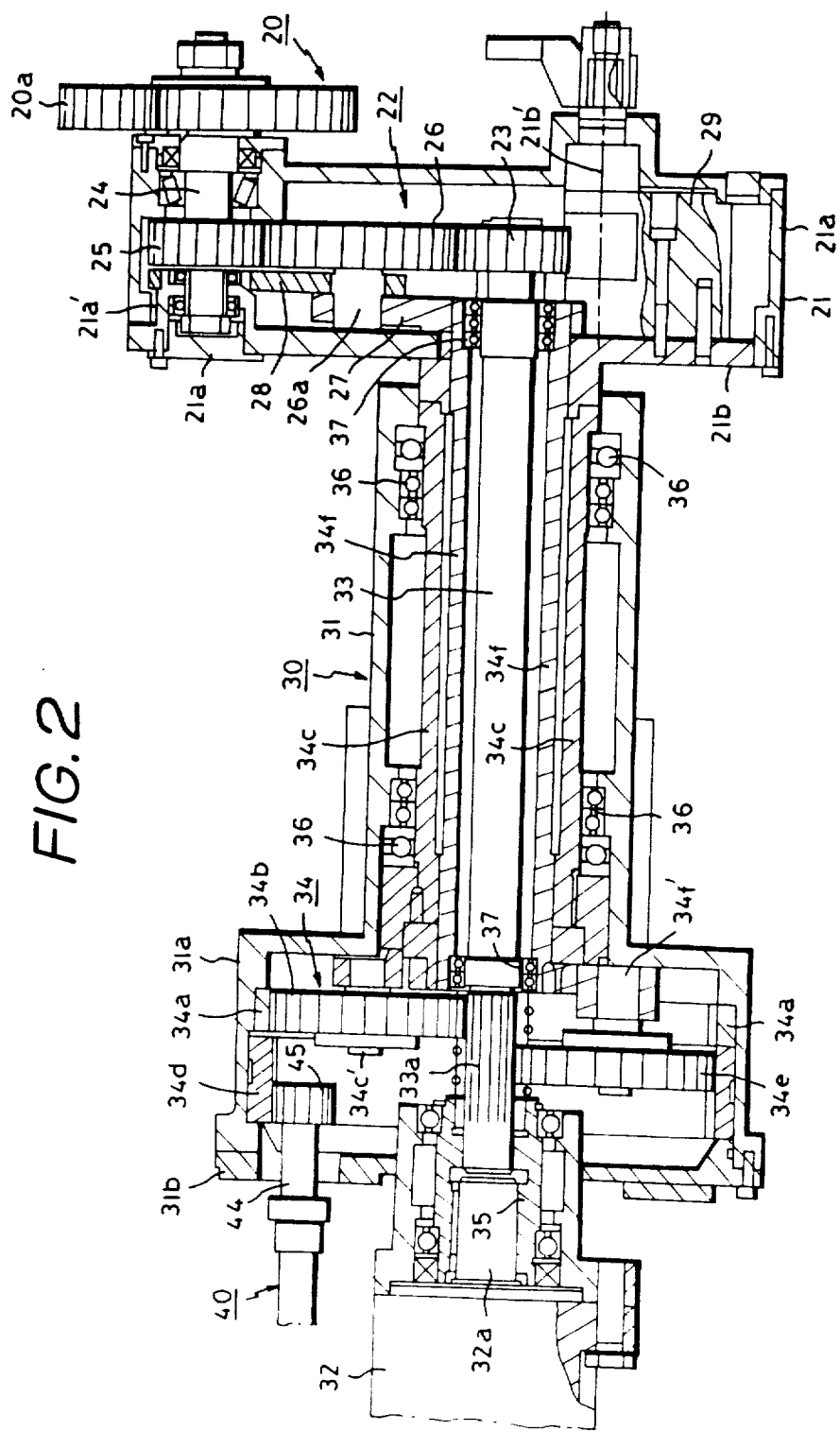
FIG. 2 is a sectional explanatory view of the inside processing apparatus in the present invention.

In the FIG. 1, an inside processing apparatus is indicated as an apparatus for cutting a groove in a fixed position of inside pipeline 60 constituted by a concrete pipe.

Consequently, a truck 10 which is in contact with an inner wall of the pipeline 60 and is drawn by cables 70a and 70b is arranged. In the truck 10, a bracket 11 is formed in the front (cable 70b side in the drawing an so forth), also a bracket 12 is formed in the rear (cable 70a side in the drawing and so forth).

In the above-mentioned truck 10, a working head 20 which is furnished with a milling cutter as the working member 20a, a driving mechanism 30, a cutting controlling mechanism 40 are constituted integrally and are loaded in the bracket 11 movably in the front and rear directions. A feed mechanism 50 is constituted by an oil pressure cylinder, and a rod adheres to an expanding diameter portion 31a of the driving mechanism 30 in company with a fact that the said cylinder adheres to the bracket 12. Therefore, by a fact that a pressure oil is supplied in the feed mechanism 50, it is possible that the above-mentioned respective mechanisms 20-40 constituted integrally are moved in the front and rear directions.

A bracket 11 which is formed at the truck 10 is provided with plural outriggers 80. The outriggers 80 acting as a fixing means are constituted by an oil pressure cylinder and are arranged at three places with a distance of 120° for example in the outer circumference of the bracket 11. Therefore, in accordance with coming into operation by supplying the pressure oil to the plural outriggers 80 simultaneously, when the inside processing apparatus is secured to the pipeline 60, at the same time it is possible that an axial center of the said inside processing apparatus is consistent with an axial center of the pipelines 60.

In the present enforcement example, the truck 10 is constituted so as to be able to draw by the cables 70a and 70b, it is possible that the said truck is constituted too as a self-propelled truck by arranging a wheel in company with installing the driving motor in the truck 10.

In the next place, the construction of the inside processing apparatus is explained concretely in accordance with FIG. 2-FIG. 5.

The driving mechanism 30 consists of a case body 31 which is inserted in the bracket 11 of the truck 10, a motor 32 including an oil pressure motor, an induction motor and the like which become the driving source, the said driving source is secured at the end of rear side of this case body 31, a shaft 33 which a rotating drive is performed by a motor 32 in accordance with installing rotatably in the case body 31, and a differential gear mechanism 34 which is disposed within an expanding diameter portion 31a formed at the end of the rear side of the case body 31. The shaft 33 is disposed in concert with an axial center of the inside processing apparatus.

The said shaft 33 and an output axis 32a of the motor 32 are connected through a sleeve coupling 35. A gear portion 33a is formed in the end of rear side of the shaft 33, and this gear 33a is constituted as the sun gear 33a in the differential gear mechanism 34. Also, the rear-mentioned working head 20 is arranged in the front side of the shaft 33.

The differential gear mechanism 34 is constituted by the two planet gear mechanisms. Namely, the first planet mechanism is constituted by an inner teeth gear 34a which is secured in the expanding diameter portion 31a, a first planet gear 34b which engages with the sun gear 33a in company with a fact which engages with this inner teeth gear 34a, and an outside sleeve 34c which installs firmly a shaft 34', the said shaft 34c' supports this first planet gear 34b rotatably. Further, the second planet gear mechanism is constituted by an inner teeth gear 34d which is disposed rotatably within an expanding diameter portion 31a, a second planet gear 34e which engages with the sun gear 33a in company with a fact which engages with this inner teeth gear 34d and an inside sleeve 34f which installs firmly a shaft 34f', the said axis 34f' supports this second planet gear 34e rotatably. The above-mentioned inner teeth gears 34a and 34d consist of the same module and the same number of teeth and also each planet gear 34b, 34e consists of the same module and the same number of teeth. Also, a gear 45 is engaged with the inner teeth gear 34d constituting the second planet mechanism, the said gear 45 is attached to the driving shaft 44 of the driving means which constitutes the cutting controlling mechanism 40.

The outside sleeve 34C is disposed on the same axis as an axis of the shaft 33, and is supported in the case body 31 rotatably through the bearing 36. The inside sleeve 34f is arranged between the outside sleeve 34c and the shaft 33, and is supported rotatably by the bearing 37 which is installed to the shaft 33. Namely, the outside sleeve 34c is inserted in the case body 31 through the bearing 36, the inside sleeve 34f is inserted in this outside sleeve 34c, and further the shaft 33 is inserted in the inside sleeve 34f. And each sleeve 34c, 34f and the shaft 33 are constituted so as to be able to rotate independently respectively.

The working head 20 is constituted by a case 21 and a gear mechanism 22 which is installed in this case 21.

The case 21 is constituted by a circular cam 21b which is installed firmly to the outside sleeve 34c constituting the first planet gear mechanism, an arm 27 which is installed firmly to the inside sleeve 34f and is inserted by the circular cam 21b and a head cover 21a which is connected with the second planet gear mechanism through a link mechanism constituted by a link plate 28. The bearing portion 21a' for supporting a shaft 24 installing a working member 20a is formed in a fixed position of the head cover 21a, and the link plate 28 is installed to this bearing portion 21a' rotatably and movably.

The circular cam 21b has a center 21b' at the position which a fixed distance is separated from an axial center of the shaft 33 namely an axial center of the inside processing apparatus and the said cam 21b rotates and moves by regarding an axial center of the shaft 33 as a center with a fixed ration of rotation in keeping with the rotation of the shaft 33.

The gear mechanism 22 is constituted by a gear 23 which is installed firmly to an end of front side of the shaft 33, a gear 25 which is installed firmly to the shaft 24 which is supported rotatably to the head cover 21a and a middle gear 26 which is engaged with the said gears 23 and 25.

Therefore, when the shaft 33 is driven, this rotation is transmitted to the shaft 24 through the gear mechanism 22, and a fixed working is performed by rotating the working member 20a which is installed on the said shaft 24.

The said middle gear 26 is supported on a shaft 26a rotatably, also the shaft 26a is supported to the arm 27 rotatably, the said arm 27 is installed firmly to the end of front side of the inside sleeve 34f constituting the second planet gear mechanism. Further, the shaft 26a is supported to the link plate 28 rotatably and movably, the said link plate 28 is installed in the bearing portion 21a' rotatably and movably. Beside, the arm 27 is constituted so as to regulate the rotating and moving direction by a stopper 29 which is installed firmly to the circular cam 21b.

The cutting controlling mechanism 40 is fixed to a base 31b which is arranged in the end of rear side of the case body 31. Considering the cutting controlling mechanism 40, it is possible that an oil pressure motor, an induction motor and the like having the detecting means of a pulse motor, a rotary encoder and the like are used, the said pulse motor, the said rotary encoder and the like are capable of controlling the quantity of rotation of the driving shaft 44.

Figure 6:
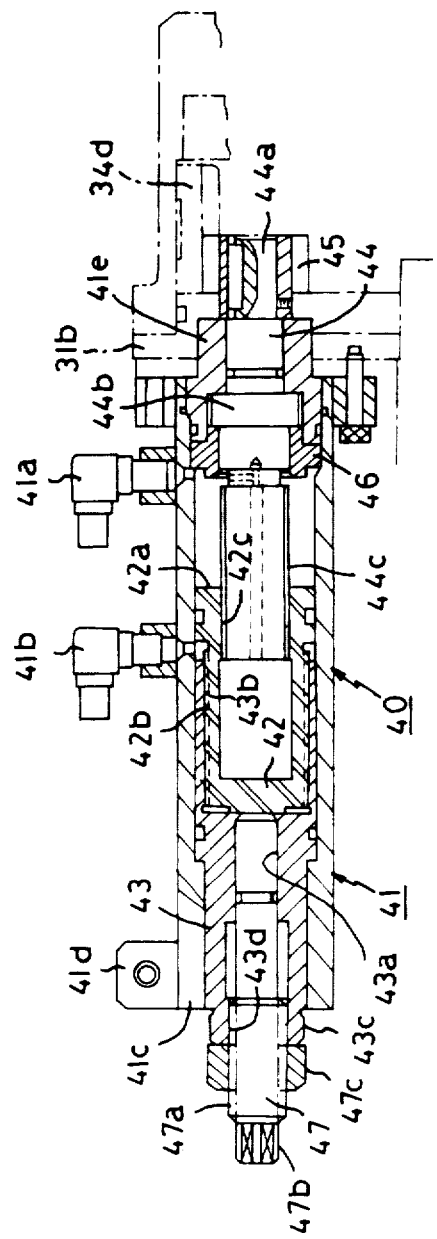
FIG. 6 is a sectional explanatory view of driving means of the inner teeth gear in the present invention.

In the present enforcement example, a rotary actuator which is constituted as shown in FIG. 6 is used as the cutting controlling mechanism 40.

In the same drawing, a piston 42 which a straight reciprocation and a rotating movement are possible in the front and rear directions, a rotating and moving member 43 which rotates and moves the piston 42, the driving shaft 44 which rotates and moves in keeping with a straight movement and a rotating movement of the piston 42, a bearing member 46 supporting the driving shaft 44 rotatably and movably, and a regulating member 47 which is inserted in the rotating and moving member 43 and regulates the stroke limit of the piston 42 are arranged respectively in the casing 41.

In a fixed position of the casing 41, ports 41a and 41b for supplying or exhausting the pressure oil in the said casing 41 are arranged. Also, a slit 41c is formed in the end of rear side of the casing 41 and contracting member 41d, the rotating and moving member 43 is fixed in the casing 41 by constricting the slit 41c by means of this bolt, and a fixation of the rotating and moving member 43 is released by loosening the bolt, and then the said rotating and moving member 43 is constituted so as to be able to rotate and move.

The piston 42 is formed in a cup-shape having a flange 42a. Also, a spline 42b is formed in the outer circumference of the piston 42, and a screw, or threaded portion 42c having a fixed pitch is formed in the inner circumference.

A hole 43a for inserting and combining the regulating member 47 in the center of the rotating and moving member 43 is formed, and a spline 43b engaging with the spline 42b formed in the piston 42 is formed in the front side. Also, a chamfering portion 43c having nut-shape is formed in the outer circumference of the end of rear side of the rotating and moving member 43, and a screw portion 43d is formed in the inner circumference of the said chamfering portion 43c.

A gear 45 engaging with the inner teeth gear 34d is attached to the front side 44a of the driving shaft 44. A projection 44b having flange shape is formed over whole circumference in a fixed position of the driving axis 44, and the driving axis 44 is restricted by the bearing member 46 and a cap 41e which is attached to the end of front side of the casing 41. Therefore, the driving axis 44 is constituted so as to be able to rotate with movement in regard to the axial direction. A threaded portion 44c engaging with the threaded portion 42c which is formed with the piston 42 is formed in the rear side of the driving shaft 44.

A threaded portion 47a engaging with the threaded portion 43d which is formed in the rotating and moving member 43 is formed in the rear side of the regulating member 47, and the chamfering portion 47b is formed in the end of rear side by continuing with this screw portion 47a. Also, a lock nut 47c is screwed and combined in the threaded portion 47a.

Considering the rotary actuator which is constituted as mentioned above, when the rotating and moving member 43 is rotated and moved by loosening the contracting member 41d and engaging a spanner with the chamfering portion 43c of the rotating and moving member 43, this rotation and movement is transmitted to the piston 42 through the splines 43b and 42b and then the said piston 42 is rotated and moved. And, the rotating movement of the piston 42 is transmitted to the driving shaft 44 through the screw portions 42c and 44c and rotates and moves the said driving shaft 44. Consequently, the gear 45 which is attached to the driving shaft 44 rotates and moves, and the inner teeth gear 34d is rotated and moved. Therefore, it is possible that the gear 45 is rotated and moved freely in keeping with the rotating movement of the rotating and moving member 43, and it is possible that the initial radius is instituted by moving the working member 20a to the radial direction by means of the rotating movement of this rotating and moving member 43.

Also, by constricting the contracting member 41d, when the pressure oil is supplied in the port 41b in company with a fact that the rotating and moving member 43 is fixed to the casing 41, the piston 42 is restricted by the splines 42b and 43b, and the said piston moves to the front of the axial direction (right direction in the drawing). The straight movement of this piston 42 is converted into the rotating movement of the driving shaft 44 by the threaded portions 42c and 44c. Therefore, a quantity of rotating movement of the driving shaft 44 is regulated by a stroke of the piston 42 and a pitch of the threads in the threaded portions 42c and 44c.

It is possible that the stroke of the piston 42 is regulated by the regulating member 47 which is inserted and combined in the rotating and moving member 43.

Namely, when the regulating member 47 is rotated and moved by loosening the lock nut 47c and engaging the spanner with the chamfering portion 47B, the said regulating member 47 moves to the axial direction by screwing and combining of the threaded portions 47a and 43d. Therefore, it is possible that the stroke of the piston 42 is regulated by projecting the regulating member 47 in the casing 41 from the rotating and moving member 43. When the stroke of the piston 42 is regulated as mentioned above, a quantity of rotation of the gear 45 is established, and consequently it is possible that a quantity of movement to the radial direction of the working member 20a is established.

In the next place, the explanations with regard to the operations of the working head 20, the driving mechanism 30 and the cutting controlling mechanism 40 which are constituted as mentioned above are performed.

In the first place, before the inside processing apparatus is inserted in the pipeline 60, the working member 20a which is suitable to the work given to the said pipeline 60 is selected and this working member 20a is installed on the shaft 24 which is arranged in the working head 20. And, the initial radius of the working member 20a is established in response to the inside diameter of the pipeline 60.

This establishment rotates and moves the rotating and moving member 43 in the cutting controlling mechanism 40 at the state cutting controlling mechanism 40 at the state which the motor 32 is and it is possible that the said establishment is performed by rotating and moving the inner teeth gear 34d and the second planet gear mechanism. Namely, when the arm 27 rotates and moves in the B direction of an arrow by regarding the shaft 33 as a center by means of the rotating movement of the second planet gear mechanism in the FIG. 4, an intersecting angle between the said arm 27 and the link plate 28 changes by the rotating movement of this arm 27 as well as the head cover 21a is rotated and moved in the B direction of an arrow by regarding the center 21' of the circular cam 21b as a center. Since a distance between the working member 20a and the shaft 33 is segregated in keeping with a change of the intersecting angle in the link mechanism and the rotating movement of the head cover 21a, it is possible that the said working member 20a is moved in the radial direction of the pipeline 60. At this time, the initial radius is established in order that a distance between the outer circumference of the working member 20a and the inner wall of the pipeline 60 may become a fixed value.

Secondly, a cutting depth of the working member 20a in response to the depth of groove which should be formed by cutting in the pipeline 60 is established. In this establishment, in response to a value which a distance between the inner wall of the pipeline 60 and the outer circumference of the said working member 20a in the establishing time of the initial radius of the working member 20a and a depth of the groove to be formed are added, the stroke of the piston 42 in the cutting controlling mechanism 40 is established. Therefore, the rotating and moving member 43 is fixed in the casing 41, the regulating member 47 in the casing 41 is established properly and then the stroke of the piston 42 is regulated.

In this way, when a moving limit is obtained by moving the said piston 42 in the casing 41 by means of regulating the stroke of the piston 42, it is possible that a groove having a fixed depth is processed in the pipeline 60 by the working member 20a.

Next, as mentioned above, the inside processing apparatus which the initial radius and the cutting depth and the like of the working member 20 are established is inserted in the pipeline 60, and the said inside processing apparatus is pulled until the position which a groove established previously by the wires 70a and 70b is formed. And, by operating the outrigger 80 when the inside processing apparatus reaches to a fixed position, the fixation is performed by causing an axial center of the said inside processing apparatus to coincide with the axial center of the pipeline 60.

Figure 3:
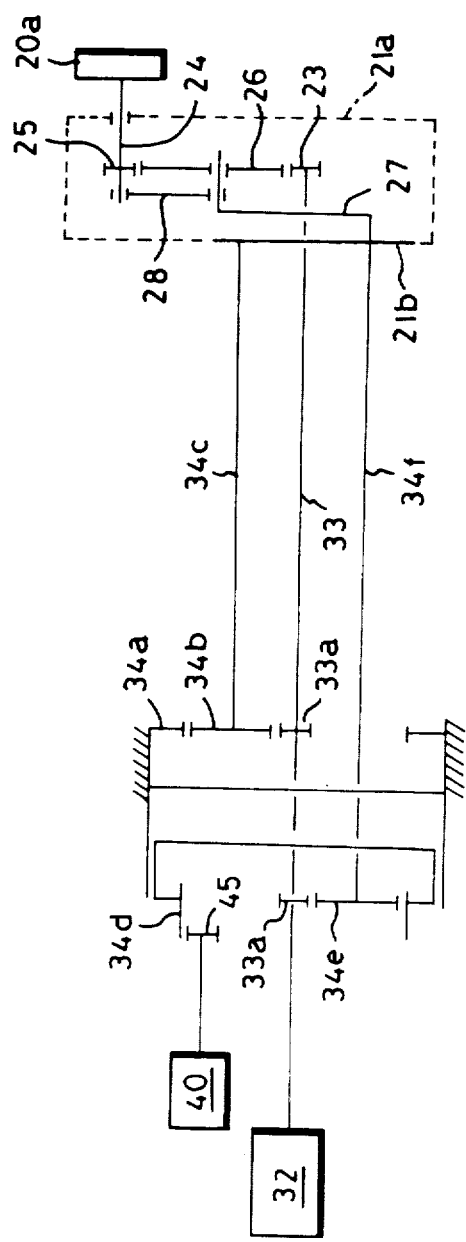
FIG. 3 is an explanatory view of the transmitting system of a driving force in the present invention.
Figure 4:
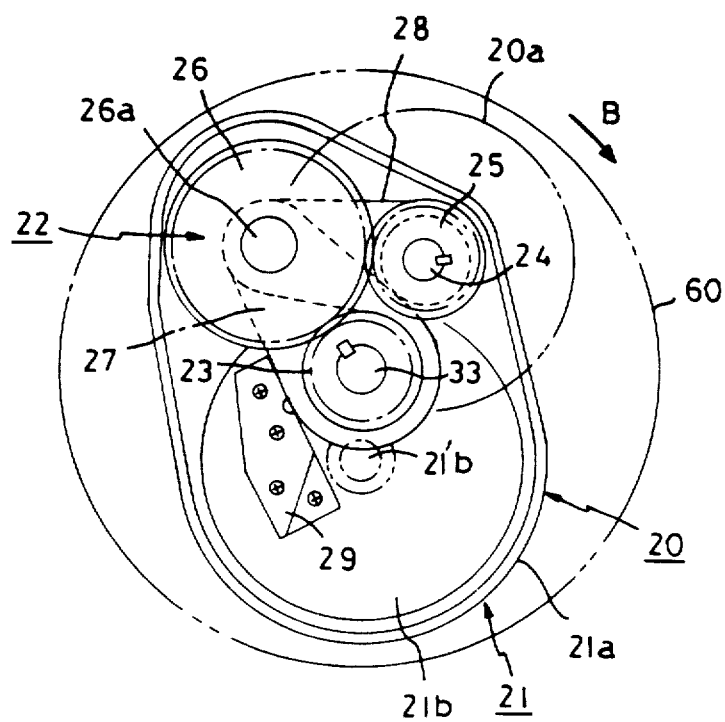
FIG. 4 is an explanatory view of construction of the working head in the present invention.
Figure 5:
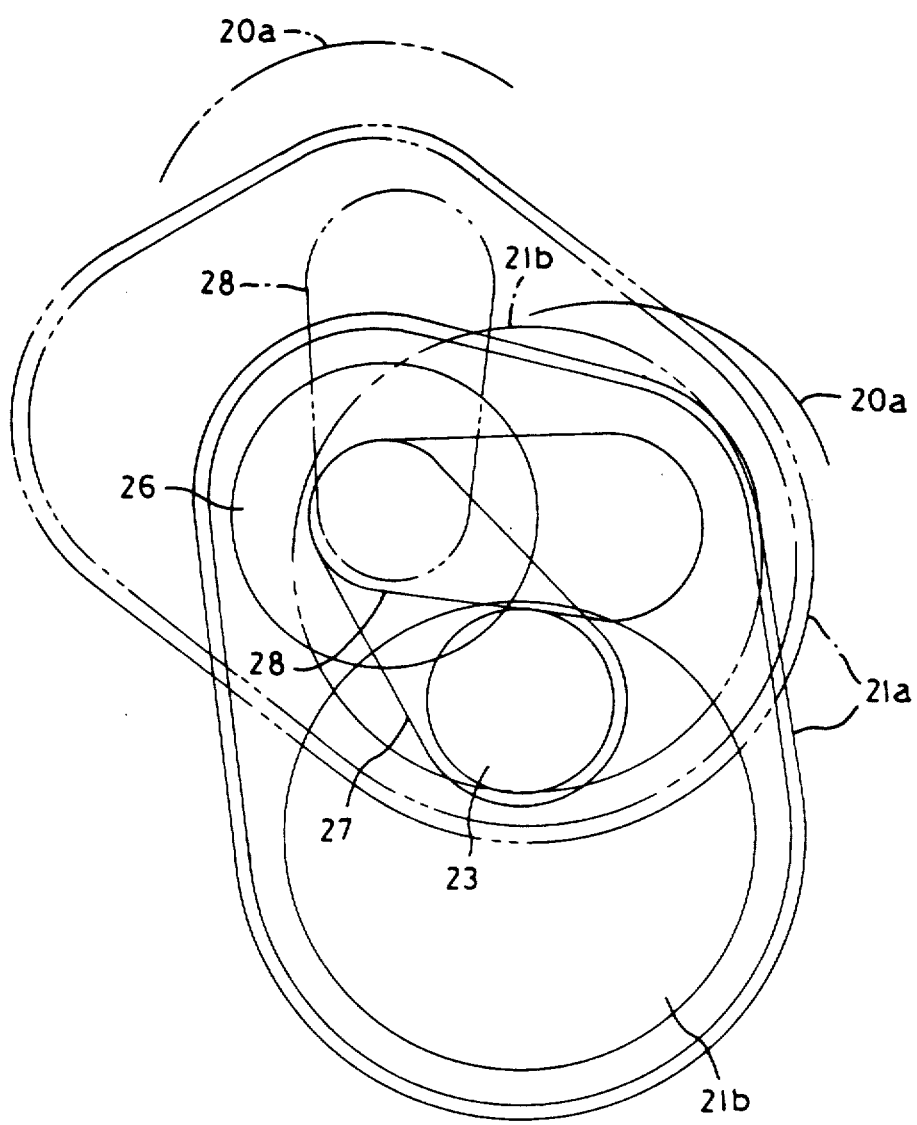
FIG. 5 is an explanatory view of operation of the working head in the present invention.

Next, the motor 32 is driven. The driving force of the motor 32 is transmitted in accordance with the system diagram as shown in FIG. 3, and the solar gear 33a rotates, the working member 20a rotates as well as the first planet gear mechanism and the second planet gear mechanism are rotated at the same velocity respectively. Therefore, the circular cam 21b which constitutes the first planet gear mechanism and the arm 27 which constitutes the second planet gear mechanism rotate at the same velocity by regarding the shaft 33 as a center. For the purpose of this, the working member 20a rotates at the state which is maintaining the initial radius established previously by regarding the shaft 33 as a center.

When the pressure oil is supplied in the port 41a or 41b at the above-mentioned state, the piston 42 moves in the direction of left or right in the casing 41. The gear 45 rotates in keeping with this movement, and the inner teeth gear 34d is rotated and moved. At this time, in order to produce the relative difference of velocity between the first planet gear mechanism and the second planet gear mechanism, the variation of the intersecting angle between the arm 27 and the link plate 28 and the rotation which the circular cam 21b is regarded as a center are generated. For the sake of this, since these operations are compounded, a distance between the working member 20a and the shaft 33 varies, and then the initial radius of the said working member 20a varies.

In the FIG. 6, an operation of the working head 20 in the time which the differential motion is given to the differential gear mechanism 34 is indicated typically by regarding the shaft 33 (gear 23) as a center and fixing the shaft 33 and the middle gear 26. In the drawing of FIG. 6, a solid line indicates a state of the time which the initial radius is established in the working member 20a, and a chain line of two points indicates a state of the time which the working member 20a is converted into the working radius by moving the piston 42.

As mentioned above, after a fixed cutting is performed on the inner wall of the pipeline 60 by the working member 20a, when the supply of the pressure oil to the cutting controlling mechanism 40 is intercepted, since the gear 45 is locked by the driving shaft 44, the inner teeth gear 34d is fixed. Therefore, the first planet gear mechanism and the second planet gear mechanism rotate at the same velocity respectively, it is possible that a fixed groove is processed by cutting while the working member 20a is moved along the inner wall of the pipeline 60.

After the working member 20a makes one revolution along the inner wall of the pipeline 60 and a fixed groove is processed in the said inner wall, when the pressure oil is supplied to the port 41b or 41a which is opposite to the time of cutting while the solar gear 33a is rotated or stopped, the piston 42 moves to the direction of right or left within the casing 41. In keeping with this movement, the gear 45 rotates and then the inner teeth gear 34d is transmitted to the head cover 21a and the said cover 21a is rotated by regarding a center 21b' of the circular cam 21b as a center, the working member 20a is shunted to the position of the initial radius.

Subsequently, when the outrigger 80 is shunted, the fixation in regard to the pipeline 60 is released in the inside processing apparatus. Thereafter, it is possible that a groove is processed by cutting in the inner wall of the pipeline 60 by using a milling cutter as the working member 20a is performed, but for example in the case which a root of tree and the like invaded in the pipeline 60 are cut, it is satisfactory that a cutter for cutting is installed to the shaft 24, and also in the case which the inner wall of the pipeline 60 is cleaned, it is satisfactory that a wire brush or a grinder and the like as the working member 20a are installed to the shaft 24. Further, in the case which the pipeline 60 is cut, it is satisfactory that a discord cutter and the like as the working member 20a are installed to the shaft 24.

Also, in the above mentioned enforcement example, the construction is performed so as to rotate the working member 20a by transmitting the driving force of the motor 32 to the shaft 24 through the shaft 33 and the gear mechanism 22, but it is satisfactory too that the construction if performed so as to be able to drive singly the working member 20a by connecting an exclusive motor to the shaft 24. In this case, it is possible too that an axis of the rotation of the working member 20a is established in the direction intersecting straightly with the axis of the pipeline 60.

Besides, in the said enforcement example, an explanation with regard to the case which a groove is processed by cutting in the water pipe is performed, but it is possible too that the inside processing apparatus in accordance with the present invention is used on the occasion which the cylindrical processing including a cutting processing, a grinding processing and the like is given to the cylindrical inner surface such as oil pressure cylinder, air cylinder, engine block and the like for example.

What is claimed:

1. An inside processing apparatus which defines an axial center, comprising:

a working head having a working member for performing operations on an inner wall of a pipe;

a driving mechanism for moving said working member in a circumferential direction with respect to the inner wall; and a cutting controlling mechanism for adjustably moving said working head in a radial direction with respect to the inner wall;

wherein said working head comprises a circular cam having a center at a fixed distance from the axial center of the inside processing apparatus, said circular cam being rotatable around the axial center, and a head cover having a link mechanism, said head cover engaging with a cam surface of said circular cam and being rotatable about the center of said circular cam, said head cover rotatably supporting a shaft on which the working member is attached, and wherein said driving mechanism comprises a sun gear, a first planet gear connected with the circular cam, said first planet gear engaging with said sun gear in the working head, and a second planet gear which engages with said sun gear and is connected with the head cover in the working head through the link mechanism.

2. The inside processing apparatus as defined in claim 1, wherein said cutting controlling mechanism comprises an internal gear in rotating engagement with the second planet gear, and a driving means for driving said internal gear.

3. The inside processing apparatus as defined in claim 2, wherein said driving means comprises a cup-shaped piston having an axis, said piston being axially movable and rotatable on said axis, a driving shaft having an axis and a circumferential face, a threaded area of the circumferential face engaging with a threaded internal face of the cup-shaped piston, whereby said driving shaft is rotatable on its axis during an axial movement of the cup-shaped piston, a rotary member having an area in engagement with an outer portion of the cup-shaped piston, whereby the rotary member can drive the cup-shaped piston, a casing accommodating the cup-shaped piston, the shaft and the rotary member, and a means for securing said rotary member to said casing.

4. The inside processing apparatus as defined in claim 2, wherein said driving means comprises a cup-shaped piston having an axis, said piston being axially movable and rotatable on said axis, a driving shaft having an axis and a circumferential face, a threaded area of the circumferential face engaging with a threaded internal face of the cup-shaped piston, whereby said driving shaft is rotatable on its axis during an axial movement of the cup-shaped piston, a rotary member having an area in engagement with an outer portion of the cup-shaped piston, whereby the rotary member can drive the cup-shaped piston, a stroke length regulating means including a limit member for limiting the length of strokes of said cup-shaped piston, a casing accommodating the cup-shaped piston, the shaft, the rotary member and the stroke length regulating means, and a means for securing said rotary member to said casing.

5. The inside processing apparatus as defined in claim 2, further comprising a fixing means for positioning the inside processing apparatus within a pipe such that the axial center of the inside processing apparatus coincides with an axis of the pipe, and fixes the inside processing apparatus to the pipe.

6. The inside processing apparatus as defined in claim 2, further comprising a truck on which the working head, the driving mechanism and the cutting controlling mechanism are mounted.

7. The inside processing apparatus as defined in claim 3, further comprising a fixing means for positioning the inside processing apparatus within a pipe such that the axial center of the inside processing apparatus coincides with an axis of the pipe, and fixes the inside processing apparatus to the pipe.

8. The inside processing apparatus as defined in claim 4, further comprising a fixing means for positioning the inside processing apparatus within a pipe such that the axial center of the inside processing apparatus coincides with an axis of the pipe, and fixes the inside processing apparatus to the pipe.

9. The inside processing apparatus as defined in claim 3, further comprising a truck on which the working head, the driving mechanism and the cutting controlling mechanism are mounted.

10. The inside processing apparatus as defined in claim 4, further comprising a truck on which the working head, the driving mechanism and the cutting controlling mechanism are mounted.

* * * * *

UNITED STATES PATENT AND TRADEMARK OFFICE
CERTIFICATE OF CORRECTION

PATENT NO. : 5,054,976

DATED : October 8, 1991

INVENTOR(S) : Toahio Akesaka and Takashi Ogawara

It is certified that error appears in the above-identified patent and that said Letters Patent is hereby corrected as shown below:

Column 1, line 47, "an" should read --as--.

Column 2, line 39, "an axis" should read --a shaft--.

Column 4, line 60, "an" should read --and--.

Column 5, line 56, please delete "34', the said shaft".

Column 5, line 64, "axis" should read --shaft--.

Column 7, line 43, "axis" should read --shaft--.

Column 7, line 46, "axis" should read --shaft--.

Column 7, line 64, "splines" should read --sp-lines--.

Column 8, line 53, delete "cutting controlling mechanism 40 at".

UNITED STATES PATENT AND TRADEMARK OFFICE
CERTIFICATE OF CORRECTION

PATENT NO. : 5,054,976
DATED : October 8, 1991
INVENTOR(S) : Toahio Akesaka and Takashi Ogawara It is certified that error appears in the above-identified patent and that said Letters Patent is hereby corrected as shown below:

Column 8, line 54, delete "the state".

Column 8, line 54, insert "is stopped" after --motor 32--.

Signed and Sealed this

Sixteenth Day of May, 1995

Attest:

BRUCE LEHMAN

Attesting Officer

Commissioner of Patents and Trademarks